United States Patent
Hoell et al.

(10) Patent No.: US 8,839,943 B2
(45) Date of Patent: Sep. 23, 2014

(54) CONVEYOR APPARATUS FOR AN ASSEMBLY LINE

(71) Applicants: Kenneth Damgaard Hoell, Vejle (DK); Jakob Mikkelsen, Brande (DK); John Krath Pedersen, Herning (DK); Martin Bach Soerensen, Herning (DK)

(72) Inventors: Kenneth Damgaard Hoell, Vejle (DK); Jakob Mikkelsen, Brande (DK); John Krath Pedersen, Herning (DK); Martin Bach Soerensen, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/732,594

(22) Filed: Jan. 2, 2013

(65) Prior Publication Data
US 2013/0175138 A1 Jul. 11, 2013

(30) Foreign Application Priority Data

Jan. 10, 2012 (EP) .................................. 12150612

(51) Int. Cl.
| | |
|---|---|
| B65G 19/02 | (2006.01) |
| B65G 49/00 | (2006.01) |
| B61B 10/04 | (2006.01) |
| F03D 11/00 | (2006.01) |
| B61B 10/00 | (2006.01) |
| B61B 9/00 | (2006.01) |

(52) U.S. Cl.
CPC ................ *B65G 49/00* (2013.01); *B61B 10/04* (2013.01); *F03D 11/00* (2013.01); *B61B 10/00* (2013.01); *B65G 19/02* (2013.01); *B61B 9/00* (2013.01)

USPC .................. 198/343.1; 198/465.1; 104/172.3; 104/173.1

(58) Field of Classification Search
CPC ........ B65G 19/02; B65G 17/12; B65G 17/02; B61B 10/04
USPC .......... 198/343.1, 465.1, 465.2, 172.3, 173.1; 104/172.3, 173.1
See application file for complete search history.

(56) References Cited

U.S. PATENT DOCUMENTS

| | | | | |
|---|---|---|---|---|
| 2,883,943 | A | | 4/1959 | Ingold |
| 3,349,720 | A | | 10/1967 | Pender |
| 3,518,946 | A | * | 7/1970 | Kavieff ...................... 104/172.3 |
| 3,661,094 | A | * | 5/1972 | Pachuta ..................... 104/172.3 |
| 4,438,701 | A | * | 3/1984 | Murai et al. ............... 104/172.3 |
| 4,483,252 | A | * | 11/1984 | Pierson ...................... 104/172.3 |
| 4,646,650 | A | * | 3/1987 | Kondo et al. .............. 104/172.3 |
| 4,944,228 | A | * | 7/1990 | Rhodes ...................... 104/172.3 |
| 4,944,229 | A | * | 7/1990 | Arakawa et al. ............... 104/137 |
| 4,947,978 | A | * | 8/1990 | Rhodes .................... 198/341.02 |
| 6,324,992 | B1 | * | 12/2001 | Morikiyo et al. .......... 104/172.3 |

FOREIGN PATENT DOCUMENTS

| | | |
|---|---|---|
| DE | 3713431 A1 | 11/1988 |
| EP | 1999043 A1 | 12/2008 |

\* cited by examiner

*Primary Examiner* — Mark A Deuble

(57) ABSTRACT

A conveyor apparatus for an assembly line having a number of assembly stations is provided. The conveyor apparatus has a guide realized to define a path of travel for an assembly station, an engaging unit for engaging an assembly station to the guide, and a driving unit for driving the engaging unit along the guide such that the assembly station is moved through successive stages of the assembly line. The assembly line is used for assembling a generator for a wind turbine.

12 Claims, 3 Drawing Sheets

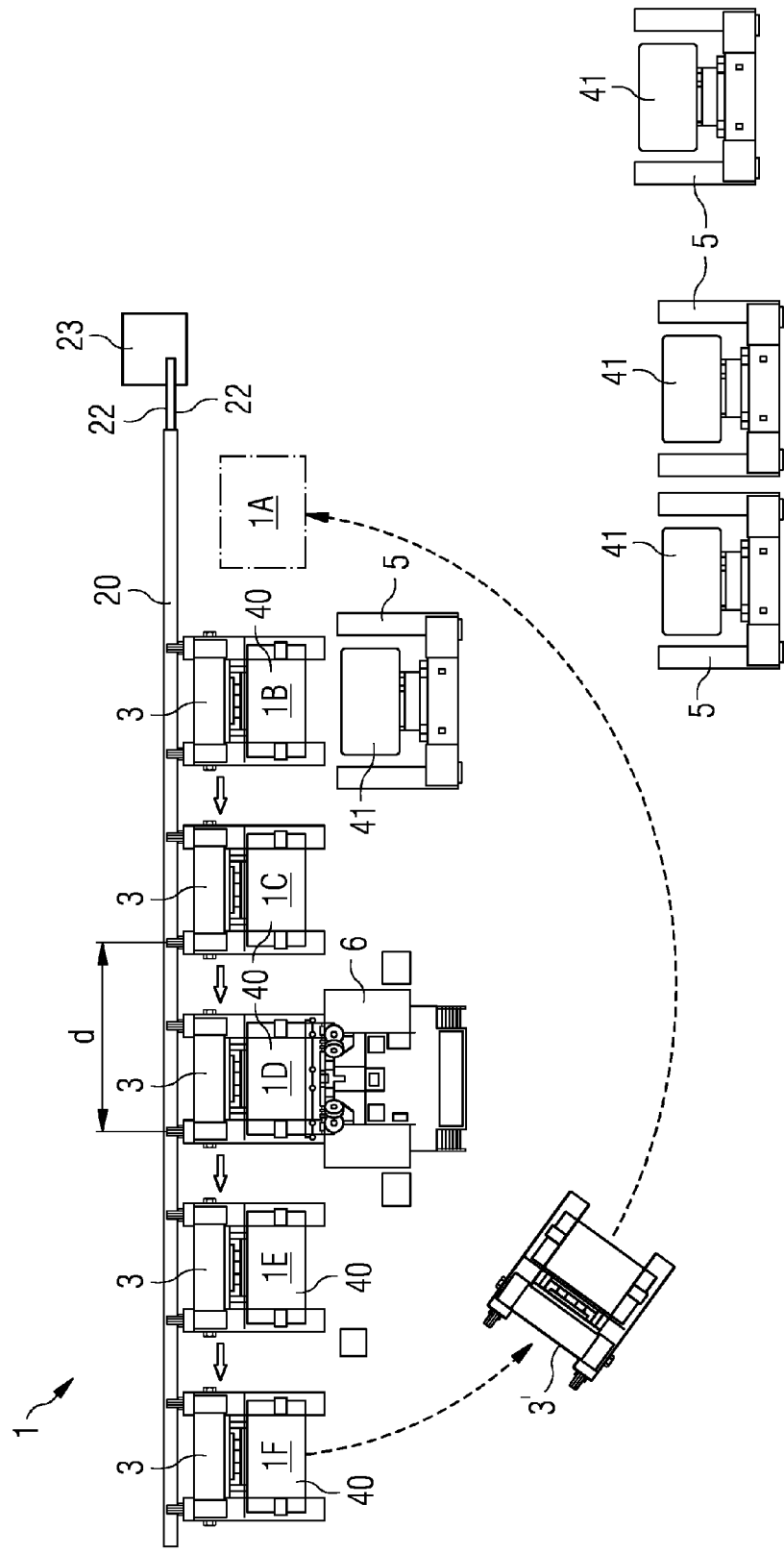

CONVEYOR APPARATUS FOR AN ASSEMBLY LINE

CROSS REFERENCE TO RELATED APPLICATIONS

This application claims priority of European Patent Office application No. 12150612.5 EP filed Jan. 10, 2012, which is incorporated by reference herein in its entirety.

FIELD OF INVENTION

The application describes a conveyor apparatus for an assembly line, an assembly station, an assembly line and a method of assembling a generator for a wind turbine.

BACKGROUND OF INVENTION

An armature and a field magnet arrangement for a generator can be assembled in various successive assembly stages. In one example of a rotor assembly procedure, various components such as a bearing and a hub interface are mounted in a first assembly step to a hollow annular rotor shaft. A form-retaining element can be temporarily mounted onto the rotor so that this maintains its circular shape during the assembly stages. A circular shape is mandatory, considering the weight of the magnet poles. The stator can be merged with the rotor at one assembly stage, for example by connecting the stator shaft to the previously mounted bearing. In this step, extreme care must be taken to maintain a constant air gap between the rotor and the stator. In a subsequent assembly step, cabling can be installed and connected. In another step, the magnets can be mounted onto the rotor. In a final stage, a brake disc is mounted onto the rotor. This assembled part of the generator can then be transferred to a next assembly area for incorporating into a nacelle.

A conventional wind turbine generally comprises a gearbox to increase the rotational speed of its generator relative to its rotor shaft and to increase the pole change frequency. A gearbox comprises many components that are subject to wear and must be maintained or replaced at intervals. Complex and expensive bearing arrangements are also required to bear the extreme loads and torque acting on the rotor shaft and the gearbox. A direct-drive wind turbine has several features over such a conventional wind turbine, whereby a major feature is that a direct-drive turbine does not require such a gearbox. A direct-drive wind turbine requires fewer parts, is less complex, and more reliable. For these reasons, demand for direct drive wind turbines is increasing.

A direct-drive generator has a relatively large diameter and many magnets of altering polarity arranged along a circumference of a field magnet arrangement—usually an outside rotor—to allow for a sufficiently high pole-change frequency. The physical dimensions and weight of such a large generator pose problems during its assembly. Handling of the heavy, unwieldy and vulnerable components is complex and time-consuming, and is also hazardous, so that strict safety measures must be adhered to. This adds considerably to the overall time and cost required for the assembly of a direct-drive generator. In prior art assembly methods, a generator can be assembled in one location, i.e. any parts or tools needed for the assembly are brought to that location, and then removed to another location when no longer needed. Alternatively, a partially assembled rotor or generator assemble can be moved from one assembly area to another using equipment that is capable of carrying the heavy loads, for example cranes or other hoisting apparatus. Since several generators might be assembled simultaneously, the known methods involve much transport and moving of partially assembled generator components, tools and parts, and the risk of damage to a sensitive precision component such as a stator or a rotor is very high. For these reasons, the known methods are costly and time-consuming.

SUMMARY OF INVENTION

It is an object of the application to provide a more efficient and economical way of assembling a generator, such as a generator for a direct-drive wind turbine.

This object is achieved by the conveyor apparatus for an assembly line; by the assembly station; by the assembly line; and by the method of assembling a generator for a wind turbine.

According to the application, the conveyor apparatus for an assembly line—with a plurality of assembly stations—comprises a guide realized to define a path of travel for an assembly station; an engaging unit for engaging an assembly station to the guide; and a driving unit for driving the engaging unit along the guide such that the assembly station is moved through successive stages of an assembly line.

A feature of the conveyor apparatus of the application is that assembly steps can be carried out for a machine (i.e. a machine begin assembled) at a single assembly station from an initial assembly step to a final assembly step, without having to move or transfer the unfinished machine from one assembly station to another. The conveyor apparatus according to the application favourably requires less handling of an unfinished machine, thereby also reducing the risk of damage. Furthermore, the conveyor apparatus according to the application allows a very economic and efficient distribution of tools or devices, since the tools or devices needed for a specific assembly stage need only be supplied at the corresponding stage of the assembly line. Also, since a final assembly step can be performed at a final stage of the assembly line, a finished machine can always be presented ready for collection at the same location, thereby increasing the efficiency of transport and reducing the likelihood of accidents or errors.

According to the application, the assembly station for use in an assembly line comprises an engaging unit coupling part realized to couple the assembly station to an engaging unit of a conveyor apparatus according to the application; and an assembly station driving unit realized to allow the assembly station to travel alongside the guide of the conveyor apparatus.

According to the application, the assembly line comprises a plurality of assembly stations, wherein an assembly station is realized to hold a partially assembled component; and a conveyor apparatus according to the application for conveying an assembly station from an initial stage of the assembly line to a final stage of the assembly line.

According to the application, the method of assembling a generator for a wind turbine comprises the steps of assembling a generator component at successive stages of an assembly line according to the application, whereby the first generator component is mounted and assembled on a specific assembly station; driving the conveyor apparatus to convey the assembly station along the assembly line through successive stages of the assembly line; and merging a second generator component with the first generator component at a specific stage of the assembly line.

Embodiments and features of the application are given by the dependent claims, as revealed in the following description. Features of different claim categories may be combined as appropriate to give further embodiments not described herein.

In the following, without restricting the application in any way, it may be assumed that the machine being assembled on the assembly line is a generator for a wind turbine. Furthermore, it may be assumed that the first component mounted on an assembly station moved along the conveyor apparatus is a rotor, for example an outside rotor of a direct drive generator. Similarly, it may be assumed that the second component comprises a stator. Furthermore, it may also be assumed that the conveyor apparatus is realized to move an assembly station horizontally.

An assembly station may be understood to be a frame support realized to bear the rotor as this is being assembled. Since the assembly station can be moved along the ground, it may be referred to as a "transport frame" in the following. The transport frame is constructed such that the rotor is held horizontally, i.e. the rotation axis, about which the moving part of the generator will rotate during operation, is arranged horizontally, or parallel to a level floor surface. An assembly station comprises wheels or rollers so that it can travel along the ground and can be independently moveable when decoupled from the conveyor apparatus.

The assembly line comprises as many assembly stations as there are assembly stages or steps. In other words, if the assembly of a rotor requires ten assembly stages, the assembly line also comprises ten assembly stations, and the conveyor apparatus is realized to be long enough to accommodate the ten assembly stations. In this way, a specific assembly step can always be performed at the same assembly station. Once that assembly step has been completed for a first partially assembled rotor, that assembly station is moved by the conveyor apparatus further down the assembly line, and the next assembly station takes its place, so that this specific assembly step can be carried out on the next partially assembled rotor, and so on.

The driving unit can be incorporated in the engaging unit, for example an engaging unit can comprise its own motor realized to move the engaging unit along the guide. However, since the combined weight of an assembly station and the machine being assembled can be very heavy, such a motor would have to be correspondingly large and powerful. An embodiment of the application, the driving unit comprises a conveyor band such as a belt or cable, arranged between an initial stage of the assembly line and a final stage of the assembly line. Here, the terms "initial stage" and "final stage" refer to the stages through which an assembly station can be moved by the conveyor apparatus according to the application. Of course, an assembly line can comprise other stages in addition to these. The conveyor band is realized as endless loop that can travel along the guide. The endless loop can comprise a suitably strong cable such as a spliced steel cable. To move the conveyor band, the driving unit comprises a suitable motor realized to actuate the conveyor band. The driving unit is similar to a cable-car arrangement.

The guide itself is shaped to allow the engaging unit to travel evenly and securely. For example, the guide can comprise a steel beam or bar with a T-shaped cross-section such that the stem of the T is arranged vertically, and the bar of the T is arranged horizontally. In one embodiment, the engaging unit can simply be shaped to fit about the bar of the T. To ensure a low-friction motion of the engaging unit along the guide or guiding beam, this can be lubricated. However, in an embodiment of the application, the engaging unit can comprise a number of freely rotatable rollers that roll along the guide as the conveyor band is actuated. For example, the engaging unit can comprise at least one roller on each side of the stem of the guide, such that the rollers roll along the vertical surfaces of the guide.

The engaging unit can be realized in any suitable manner for engaging an assembly station to the guide, for example the engaging unit might be realized to be fastened using fasteners to a conveyor band. At an initial stage of the assembly line, the engaging unit for an assembly station would be connected to the conveyor band, and disconnected again once the assembly station has reached the final stage of the assembly line. The connection and disconnection steps might require some time to perform. In a further embodiment of the application, the driving unit comprises a hook connected to the conveyor band, which hook is realized to engage with the engaging unit without the need for fasteners. Since the book can simply engage with the engagement unit, an assembly station can simply "hook into" the conveyor apparatus at the initial stage of the assembly line, and can simply "hook out" of the conveyor apparatus at the final stage of the assembly line. This embodiment can be even more economical. Such an arrangement, with a hook, a cable and a guide rail, has the feature that it is very compact and can be fitted so as not to interfere with work that must be carried out along the assembly line. Such a conveyor system can be realized at a favourably low cost.

To ensure that the book and the engaging unit do not inadvertently disengage as an assembly station is being moved along the assembly line, in an embodiment of the application the engaging unit comprises a hook coupling part for coupling the engaging unit to the hook.

Once an assembly station has reached the final stage of the assembly line, the hook could be removed from the conveyor apparatus at that final stage and carried back to the initial stage where it can be connected once again to the conveyor band. However, in a further embodiment of the application, the conveyor apparatus is realized to return the hook from a final stage of the assembly line to an initial stage of the assembly line. The "return" can be effected automatically, for example in a two-cable realisation of the conveyor apparatus in which the hook can be decoupled from the first cable and transported back to the beginning or initial stage of the assembly line along the second cable. Alternatively, the conveyor apparatus can comprise a conveyor chain with a number of dogs that can pull the assembly stations on the one side, and can return the pulling chain wheel on the other side. Pins or other engaging unit coupling parts of the assembly station can engage with the dogs, the chain can then be pulled forward in the direction of the final stage of the assembly line to move each assembly station to the next stage, whereupon the chain can be given some slack to release tension.

To ensure that the engaging unit does not inadvertently disengage from the assembly station, and to ensure that the assembly station is securely "anchored" on the engaging unit, the engaging unit comprises an assembly station coupling part for coupling the engaging unit to the assembly station. For example, the assembly station might comprise a rod or bar that is shaped to fit into a corresponding opening or cavity of the engaging unit.

As indicated above, an assembly line can comprise several assembly stations. These all move synchronously along the conveyor apparatus. To this end, a "leading" assembly station could be connected to a following assembly station by a tow rope, and the remaining assembly stations could also be interconnected in this manner to form a linked line. In such a realisation, only the "lead" assembly station would need to be pulled by the conveyor apparatus, and all subsequent assembly stations are compelled to follow. However, this would require that, when the final assembly stage is completed for the "lead" assembly station, this leaves the assembly line, and the following assembly station would have to be connected to the engaging unit. Furthermore, the engaging unit would have to be dimensioned according to the weight of the assembly stations. In an embodiment of the application, the conveyor apparatus comprises at least one engaging unit for each assembly station of a plurality of assembly stations of the assembly line. In this embodiment, the assembly stations are spaced apart according to the distances between the engaging unit of the conveyor apparatus, and the assembly stations need not be interconnected but can be independent from each other.

When the driving unit actuates the conveyor band, the engaging unit are all displaced synchronously in the same direction, so that all the assembly stations are compelled to move synchronously in the same direction also.

The various stages of assembly are carried out at assembly stages of the assembly line. Such an assembly line can comprise dedicated areas or specific assembly stages, whereby an assembly stage takes place within the region bounded by a dedicated area. To allow for a straightforward progression along the assembly line, these dedicated areas are spaced apart by equal distances. In a further embodiment of the application, the driving unit is realized to displace an engaging unit by a predefined distance along the guide. For example, once each assembly stage has been completed for the assembly stages, the driving unit can be actuated to move the conveyor band and also the engaging unit, so that the assembly stations are synchronously displaced. For example, once the assembly station at the final stage has been removed from the assembly line, a service technician can issue a signal to a controller of the driving unit to cause the remaining assembly stations to move along the assembly line. A "new" assembly station can then be hooked into the conveyor apparatus at the initial stage of the assembly line. In this way, all stages of the assembly line can be occupied at any one time for a very efficient assembly process.

An assembly station or transport frame is realized as a steel framework with outliers to which rollers or wheels 30 are attached so that the transport frame can be moved about. A transport frame comprises at least two engaging unit coupling parts for coupling with two corresponding engaging unit of the conveyor apparatus. For example, an outlier arranged to travel alongside the guide can be equipped with two such coupling parts, so that the transport frame cannot assume a skewed orientation relative to the guide. Only one type of assembly station is used in the assembly line i.e. the dimensions of the transport frames are all equal, so that each transport frame occupies the same area or space along the assembly line.

The conveyor apparatus can be arranged at ground level in an assembly hall or factory. Such an arrangement can facilitate any maintenance work that may need to be carried out. However, in an embodiment of the application, the conveyor apparatus is arranged at least partially below a floor level of the assembly line. In this way, the mechanism of the conveyor apparatus is protected from damage, and the conveyor apparatus itself is less intrusive. For example, part of a steel guide can be anchored in a concrete floor, and part of the driving unit could also be arranged below ground level. For example, a "return path" for a hook and conveyor cable could be arranged below ground level.

The conveyor apparatus and the assembly stations could be realized such that the assembly line assumes a circular shape. For example, a circular guide rail could transport assembly stations in a carousel arrangement. The assembly stations can be realized to have a chassis shape based on a radial section of such a circle, and can be arranged either "inside" or "outside" the circular guide rail. The initial and final stages of such a circular assembly line can be defined in an ad hoc manner as required. In an embodiment of the application, the assembly line comprises a linear arrangement of assembly stations, since an assembly station with a square or rectangular chassis may provide a more optimal support for the heavy components being transported.

BRIEF DESCRIPTION OF THE DRAWINGS

Other objects and features of the present application will become apparent from the following detailed descriptions considered in conjunction with the accompanying drawings. It is to be understood, however, that the drawings are designed solely for the purposes of illustration and not as a definition of the limits of the application.

FIG. 3 shows a schematic plan view of the assembly line of FIG. 1 at a second time instant.

DETAILED DESCRIPTION OF INVENTION

In the diagrams, like numbers refer to like objects throughout. Objects in the diagrams are not necessarily drawn to scale.

Figure 1:
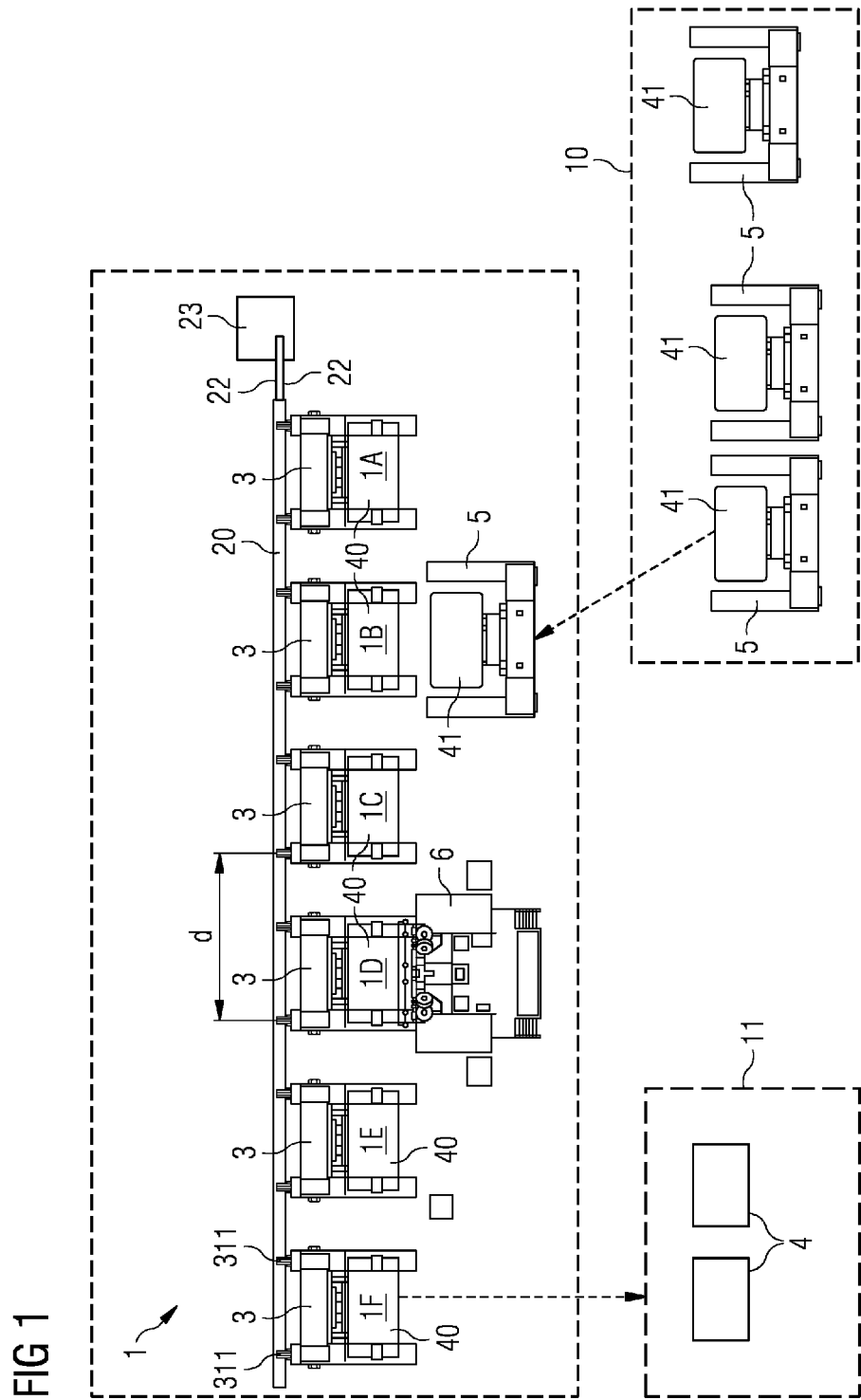
FIG. 1 shows a schematic plan view of an assembly line according to the application at a first time instant.

FIG. 1 shows a schematic plan view of an assembly line 1 according to the application at a first time instant. The assembly line 1 is used to assemble a component 4 for a wind turbine, more specifically to assemble a generator 4 for a direct drive wind turbine. The assembly line 1 comprises six distinct assembly stages 1A, . . . , 1F. At each assembly stage 1A, . . . , 1F a rotor transport frame 3 is positioned. A conveyor apparatus 2 according to the application is used to convey a rotor transport frame 3 from one assembly stage 1A, . . . , 1E to the next 1B, . . . , 1F. Each stage 1A, . . . , 1F can be dedicated to a specific assembly step, as outlined in the introduction. For example, at the second assembly stage 1B shown here, a stator 41 can be merged with a partially assembled rotor 40. The stator 41 can be transported to the assembly line 1 using a stator transport frame 5. In the fourth assembly stage 1D shown here, the rotor 40 can be equipped with a plurality of permanent magnets with the aid of a magnet assembly station 6. Of course, these assembly stages 1A, . . . , 1F are only exemplary.

The conveyor apparatus 2 comprises a conveyor loop 22, for example a spliced steel cable 22 that is driven by a motor 23 such that the cable 22 travels about a guide rail 20 in an endless loop. Each rotor transport frame 3 is engaged to the cable 22 by an engaging unit. In this embodiment, each rotor transport frame 3 comprises two coupling unit 311 for coupling it to the conveyor loop cable 22.

The assembly line 1 can occupy a certain region of a factory floor, as indicated by the boundary around the assembly line. A stator assembly area 10 can occupy another region of the factory floor, while, for example, a generator testing station 11 can occupy a further region of the factory floor.

Figure 2:
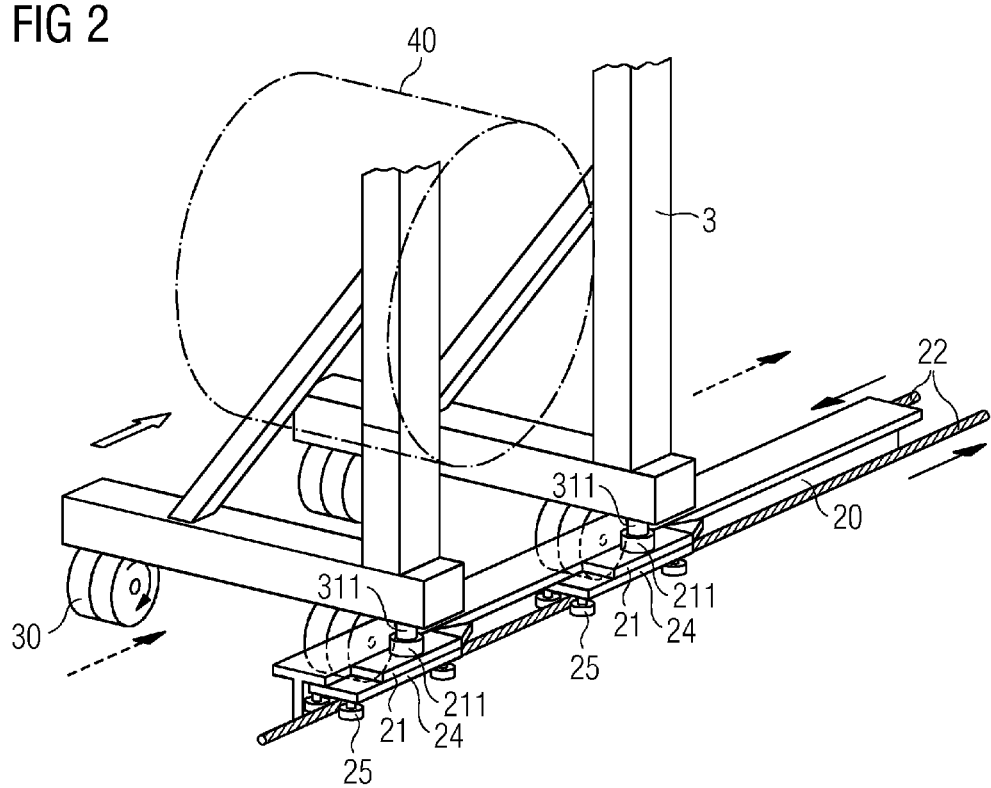
FIG. 2 shows a schematic representation of a conveyor apparatus according to an embodiment of the application and a detail of an assembly frame according to an embodiment of the application.

FIG. 2 shows a schematic representation of a conveyor apparatus 2 according to an embodiment of the application and a detail of an assembly frame 3 according to an embodiment of the application.

The guide rail 20 of the conveyor apparatus 2 comprises a rigid steel bar with a T-shaped cross-section, and is partially embedded in a foundation below floor level, so that only the bar of the T and a portion of the stem of the T are exposed above floor level. The conveyor apparatus comprises a spliced steel cable 22 arranged as an endless loop 22 about the guide rail 20. Hooks 24 are connected at intervals to the cable 22, and each hook 24 is realized to mate with a mover 21 or engaging unit 21. The engaging unit 21 comprises a number of rollers 25 arranged to roll along a vertical surface of the stem of the guide rail 20 or along the cable 22, so that the assembly station 3 can proceed smoothly along the assembly line.

The assembly frame 3 comprises two coupling parts 311 for coupling with coupling unit 211 of two corresponding engaging unit 21 or movers 21 that are pulled by the hooks 24 connected to the conveyor cable 22.

Once the assembly station 3 has reached the final stage 1F of the assembly line 1, the assembly station 3 can be decoupled from the hook 24 and conveyor cable 22. The hook 24 can be returned automatically along a return path of the cable 22 to the initial assembly stage 1A, while the assembly station 3 can be propelled manually across the factory floor to the initial stage 1A of the assembly line 1. The mover 21 can be transported with the assembly station 3 or separately.

FIG. 3 shows a schematic plan view of the assembly line 1 of FIG. 1 at a second time instant. Here, the assembled generator 4 of FIG. 1 has been removed from the last assembly station 3', and this assembly station 3' has been decoupled from the conveyor apparatus 2. The motor 23 of the conveyor apparatus 2 has been controlled to actuate the conveyor loop 22 such that the remaining assembly stations 3 are moved forward by the same distance d, from the assembly stations 1A-1E and into the assembly stations 1B-1F. The empty assembly station 3' is now being moved back to the initial assembly stage 1A, where it can be coupled to the conveyor loop 22 and can be used to commence assembly of a further rotor 41. For example, a suitable moving apparatus can be moved under the empty assembly station 3' to transport this back to the initial stage of the assembly line.

Although the present application has been disclosed in the form of embodiments and variations thereon, it will be understood that numerous additional modifications and variations could be made thereto without departing from the scope of the application. For example, although the assembly frame described herein is described as holding the rotor with its rotation axis in a horizontal position, the assembly frame and the assembly line could equally well be designed for an assembly technique in which the rotor is held with its rotation axis in a vertical position.

For the sake of clarity, it is to be understood that the use of "a" or "an" throughout this application does not exclude a plurality, and "comprising" does not exclude other steps or elements.

The invention claimed is:

1. A conveyor apparatus for an assembly line comprising a plurality of assembly stations, comprising:
    a generator component mounted on a specific assembly station from among the plurality of assembly stations and the generator component is assembled on that specific assembly station;
    a guide realized to define a path of travel for an assembly station;
    an engaging unit for engaging the assembly station to the guide; and
    a driving unit for driving the engaging unit along the guide such that the assembly station is moved through successive stages of the assembly line,
    wherein the driving unit comprises a conveyor band arranged between an initial stage of the assembly line and a final stage of the assembly line,
    wherein the driving unit comprises a hook connected to the conveyor band, and wherein the hook is realized to engage with the engaging unit,
    wherein the engaging unit comprises a hook coupling part for coupling the engaging unit to the hook, and
    wherein the hook coupling part includes a plurality of rollers positioned about the conveyor band to roll the assembly station along the guide or the conveyor band.

2. The conveyor apparatus according to claim 1, wherein the driving unit comprises a motor realized to actuate the conveyor band.

3. The conveyor apparatus according to claim 1, wherein the conveyor apparatus is realized to return the hook from the final stage of the assembly line to the initial stage of the assembly line.

4. The conveyor apparatus according to claim 1, wherein the engaging unit comprises an assembly station coupling part for coupling the engaging unit to the assembly station.

5. The conveyor apparatus according to claim 1, further comprising a plurality of engaging units, wherein at least one of the plurality of engaging units is for each of the plurality of assembly stations of the assembly line.

6. The conveyor apparatus according to claim 1, wherein the driving unit is realized to displace the engaging unit by a predefined distance along the guide.

7. The conveyor apparatus according to claim 1, wherein the assembly station comprises:
    an engaging unit coupling part realized to couple the assembly station to the engaging unit; and
    an assembly station driving unit realized to allow the assembly station to travel along the guide of the conveyor apparatus.

8. The assembly station according to claim 7, further comprising at least two engaging unit coupling parts for coupling with two corresponding engaging units of the conveyor apparatus.

9. An assembly line, comprising:
    a plurality of assembly stations, wherein each assembly station is realized to hold a partially assembled component; and
    a conveyor apparatus according to claim 1 for conveying the each assembly station from an initial stage of the assembly line to a final stage of the assembly line.

10. The assembly line according to claim 9, wherein the component is assembled on the specific assembly station between the initial stage and the final stage of the assembly line.

11. A method of assembling a generator for a wind turbine, comprising:
    commencing assembly of a first generator component at an initial stage of an assembly line according to claim 9, wherein the first generator component is assembled on a specific assembly station;
    merging a second generator component with the first generator component at a specific stage of the assembly line; and
    completing assembly of the generator at a final stage of the assembly line.

12. The method according to claim 11, further comprising one or more steps of
    removing the generator from the specific assembly station;

disengaging the specific assembly station from the conveyor apparatus;
driving the conveyor apparatus to convey remaining assembly stations along the assembly line such that each of the remaining assembly stations progresses to a next stage of the assembly line; and
engaging the specific assembly station to the conveyor apparatus at an initial stage of the assembly line.

* * * * *